INVENTOR:
H. A. Wallace,
by A. R. Verrill
His Attorney

Fig.6.

Patented Aug. 24, 1937

2,090,716

UNITED STATES PATENT OFFICE 2,090,716

REMOTE CONTROLLING APPARATUS

Herbert A. Wallace, Edgewood, Pa., assignor to The Union Switch & Signal Company, Swissvale, Pa., a corporation of Pennsylvania Application March 10, 1928, Serial No. 260,619

27 Claims. (Cl. 246—3)

My invention relates to remote controlling apparatus, that is, to apparatus for selectively controlling a plurality of devices located at a distance from the control point. My invention is particularly suitable for, though in no way limited to, the control of traffic governing devices, such as railway switches and signals.

The apparatus of the present invention is an improvement upon that disclosed in my copending application, Serial No. 125,659, filed July 29, 1926, for Railway traffic controlling apparatus.

I will describe several forms of apparatus embodying my invention, and will then point out the novel features thereof in claims.

In the accompanying drawings, Figs. 1a and 1b, when placed end to end with Fig. 1a on the left, form a diagrammatic view illustrating one form of remote controlling apparatus embodying my invention applied to the control of switches and signals.

Similar reference characters refer to similar parts in each of the several views.

Figure 1A:
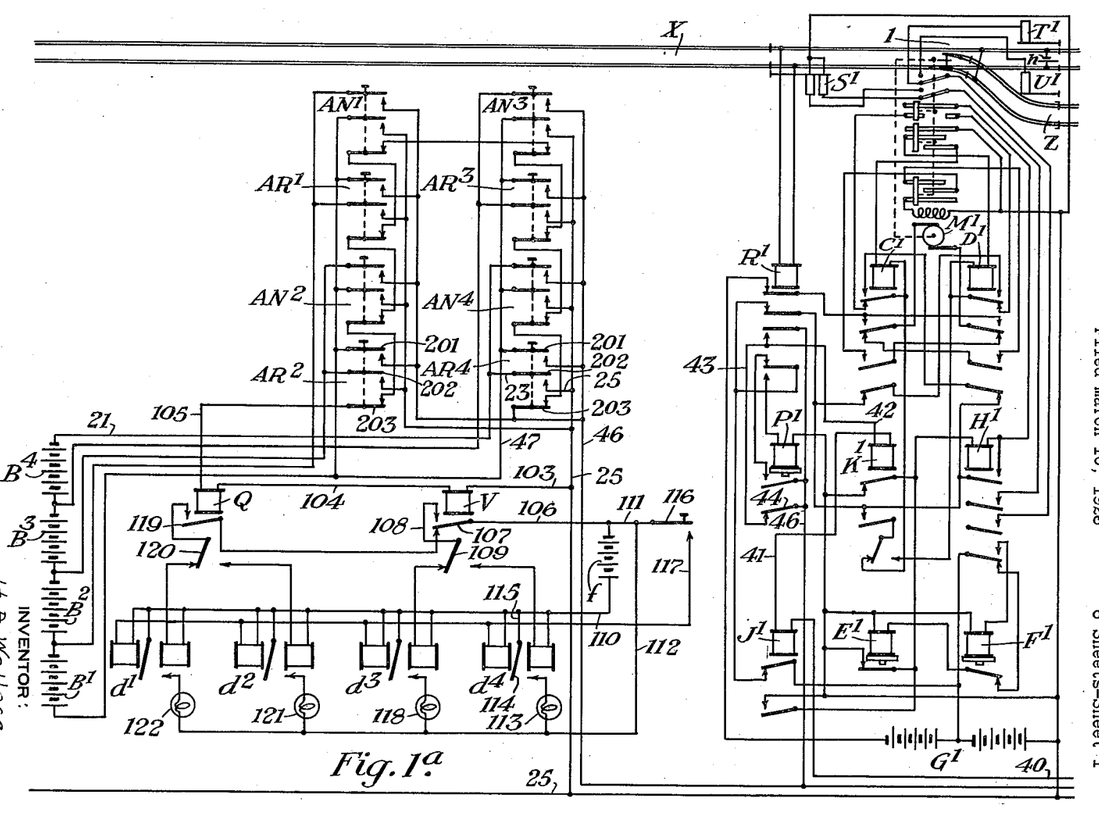
Figure 1B:
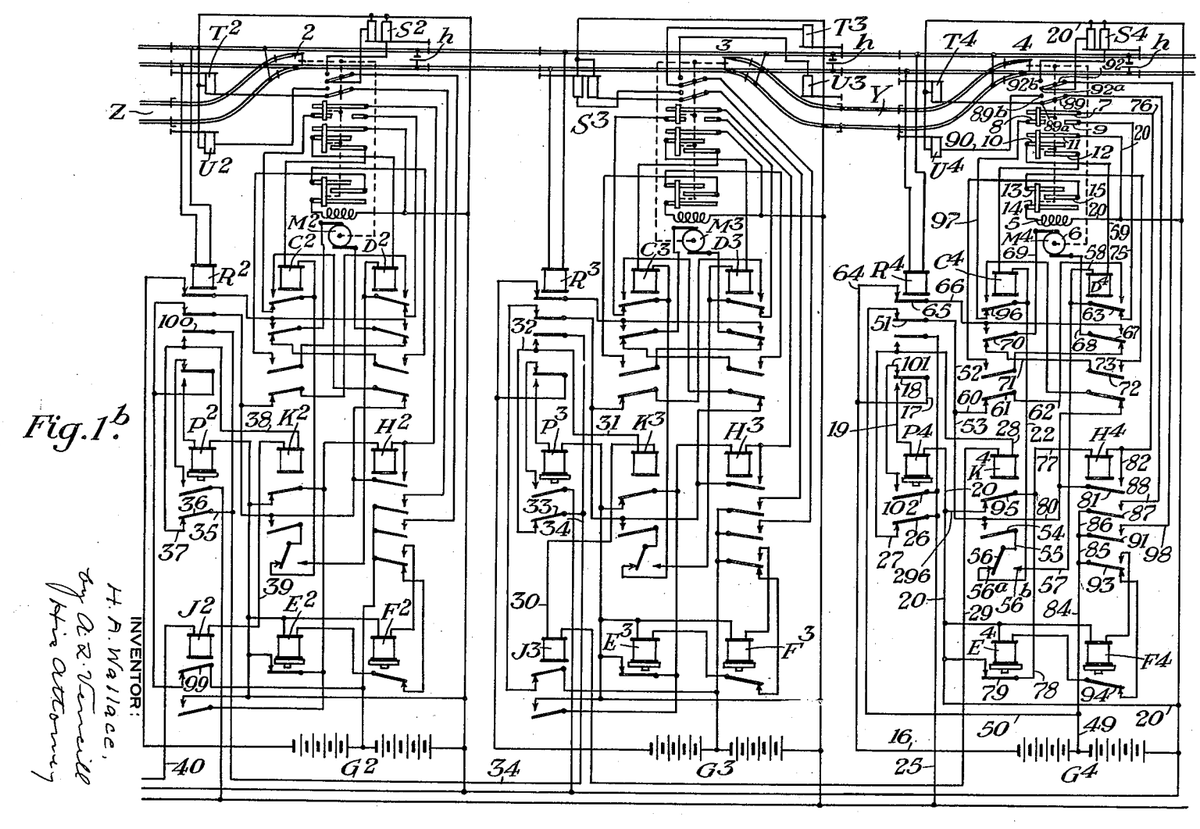

Referring first to Fig. 1, the reference character X designates a stretch of railway track which is provided with a passing siding Z having two switches 1 and 2. The stretch of track X is provided with a second siding Y having two switches 3 and 4. Each of the switches 1, 2, 3, and 4, is protected in the usual manner, by railway signals designated by the reference characters S, T and U, with exponents corresponding to the location. Referring for example, to switch 4, the signal $S^4$ controlling facing point movements, is provided with an upper blade for controlling movements along the track X and a lower blade for controlling movements into the siding Y. Trailing movements through the switch 4 are controlled by signals $T^4$ and $U^4$.

Each switch is actuated by a motor designated by the reference character M with an exponent corresponding to the location and comprising a field 5 and an armature 6. Each motor is controlled in part by a plurality of contacts which are in turn controlled by the associated switch. Referring, for example to switch 4, contact 7—8 is closed only when the switch occupies its normal position in which it is shown in the drawings, and contact 7—9 is closed only when the switch is reversed. Contacts 11—12 and 14—15 are closed at all times except when the switch is normal, and contacts 10—11 and 13—14 are closed at all times except when the switch is reversed.

Each switch motor M is controlled in part by two contactors or relays designated respectively by the reference characters C and D with exponents corresponding to the location, and selectively operated from a control point such, for example, as a dispatcher's office, as will be explained in detail hereinafter. The signals associated with each switch are controlled in part by a signal relay H having an exponent corresponding to the reference character of the associated switch. Associated with each switch and its signals are two slow releasing relays E and F, the control of which will appear as the description proceeds.

The track rails adjacent each switch are insulated to form a track section and each track section is provided with a track battery $h$ and with a track relay designated by the reference character R with an exponent corresponding to the location. It follows therefore that each track relay R is normally energized, but is de-energized when the corresponding track section is occupied by a train. Associated with each track relay is a repeater relay designated by the reference character P with a suitable distinguishing exponent; each relay P being energized when the corresponding track relay R is de-energized. Referring particularly to relay $P^4$, the circuit for this relay may be traced from the left-hand terminal of battery $G^4$, through wires 16 and 17, back contact 18 of track relay $R^4$, wire 19, winding of relay $P^4$, and common wire 20 back to the right-hand terminal of battery $G^4$.

The several groups of train governing apparatus are controlled by selective relays one of which is located adjacent each such group and each of which is designated by the reference character K with a suitable distinguishing exponent. A second selective relay J is associated with each of the switches 1, 2, and 3. The selective relays J and K are at times connected in a series circuit which is controlled by a plurality of manually operable push buttons, $AN^1$, $AR^1$, $AN^2$, $AR^2$, etc., located at the dispatcher's office. Each of these push buttons comprises two normally open contacts 201 and 202, and a normally closed contact 203. When the push button is operated, contacts 201 and 202 close and contact 203 opens, the parts returning to their normal positions when released.

In explaining the operation of the apparatus, I will first assume that the operator wishes to reverse switch 4, which is illustrated in its normal position in the drawings. To accomplish this result, he operates the push button AR⁴. When this occurs, current flows from batteries B¹, B², B³, and B⁴, in series, through wires 21 and 23, contact 202 of push button AR⁴, wire 25, back contact 26 of relay P⁴, wires 27 and 28, winding of relay K⁴, wire 29, winding of relay J³, wire 30, winding of relay K³, wires 31 and 32, back contact 33 of relay P³, wires 34 and 35, back contact 36 of relay P², wires 37 and 38, winding of relay K², wire 39, winding of relay J², wire 40, winding of relay J¹, wire 41, winding of relay K¹, wires 42 and 43, back contact 44 of relay P¹, and wire 46 through contact 201 of push button AR⁴ and wire 47 to battery B¹. It will be seen that the current supplied to this circuit traverses relays K⁴, J³, K³, K², J², J¹ and K¹ in series. When the circuit just traced is closed, the combined voltage of batteries B¹, B², B³, and B⁴ is applied to this circuit. The arrangement of the parts is such that the current thus supplied to the circuit energizes all the relays, the polar relays operating in the reverse direction to swing their polar armatures to the right. When this occurs, a pick-up circuit is closed for relay D⁴ from the mid-point of battery G⁴, through wires 49 and 50, front contact 51 of relay R⁴, wires 52 and 53, front contact 54 of relay K⁴, wire 55, reverse contact 56—56ᵇ of relay K⁴, wires 57 and 58, winding of relay D⁴, wire 59, contact 10—11 operated by switch 4, and common wire 20 back to the right-hand terminal of battery G⁴. When this pick-up circuit is closed, relay D⁴ becomes energized but it should be noted that none of the other relays D, located adjacent switches 1, 2 or 3, become energized because the circuit for each of the relays D¹, D² and D³ is open at a back contact on the associated relay J. Reverting now to relay D⁴, when this relay closes its front contact, a stick circuit is completed over which current flows from battery G⁴, through wires 49 and 50, front contact 51 of relay R⁴, wires 52 and 60, back contact 61 of relay C⁴, wire 62, front contact 63 of relay D⁴, wire 58, winding of relay D⁴, wire 59, contact 10—11 operated by switch 4, and common wire 20, back to battery G⁴. The push button AR⁴ may now be restored to its original position, thereby de-energizing relay K⁴ together with the rest of the relays K, and all of the relays J which were energized in series with relay K⁴. The pick-up circuit for relay D⁴ is therefore interrupted, but relay D⁴ remains in its energized condition, due to the stick circuit just traced. The energization of relay D⁴ completes a circuit for the switch motor M⁴ over which current flows from battery G⁴, through wires 16 and 64, front contact 65 of relay R⁴, wire 66, front contact 67 of relay D⁴, wire 68, armature 6 of motor M⁴, wire 69, back contact 70 of relay C⁴, wire 71, front contact 72 of relay D⁴, wire 73, contact 13—14 operated by switch 4, field 5 of motor M⁴, and common wire 20 back to battery G⁴. Current supplied to the motor M⁴ over this circuit operates the motor in such direction as to move the switch 4 toward its reverse position. As this movement of the switch continues, contacts 10—11 and 13—14 remain closed until the switch has assumed its full reverse position whereupon both of these contacts open. The opening of contact 13—14 breaks the motor circuit and prevents the supply of energy to the motor after the stroke of the switch has been completed. Furthermore, the contact 10—11 breaks the stick circuit for relay D⁴, allowing this relay to become de-energized and also opening the motor circuit at front contacts 67 and 72 of relay D⁴. It will be noted that since the circuit for motor M⁴ includes front contact 65 of relay R⁴, the switch can not be operated when the track section including the switch is occupied.

The switch 4 now occupies its reverse position so that trains can move over the switch to or from the siding Y. In order to indicate this condition of the switch, it is desirable for the operator to be permitted to clear the signals governing traffic in this direction over switch 4. In order to accomplish this result, the operator again actuates the push button AR⁴. Relays K¹, K², K³ and K⁴ and relays J¹, J² and J³ all become energized (relays K in the reverse direction) as has already been explained. The energization of relay K⁴ cannot now energize relay D⁴, for the reason that contact 10—11 which is included in the pick-up circuit for this relay is now open, since the switch 4 occupies its reverse position. The energization of relay K⁴ has therefore no effect upon relay D⁴ but a pick-up circuit is closed for the signal relay H⁴, current flowing from the mid point of battery G⁴, over wires 49 and 50, front contact 51 of relay R⁴, wires 52 and 53, front contact 54 of relay K⁴, wire 55, reverse contact 56—56ᵇ of relay K⁴, wire 57, back contact 63 of relay D⁴, wire 75, contact 7—9 operated by switch 4, wire 76, winding of relay H⁴, wires 77 and 78, front contact 79 of relay E⁴, and common wire 20 back to battery G⁴. When relay H⁴ picks up a branch is closed for the circuit just traced comprising a stick circuit for the relay H⁴, and current flows from wire 53, through wire 80, front contact 81 of relay H⁴, wire 82, winding of relay H⁴, and thence through wires 77 and 78 and front contact 79 of relay E⁴ and common wire 20 back to battery G⁴. It will be plain therefore that after relay H⁴ has once been picked up, it is subsequently maintained in its energized condition independently of the condition of front contact 54 of relay K⁴ by virtue of its stick circuit. The operator may, therefore, release push button AR⁴, thereby de-energizing relays J and K without de-energizing relay H⁴.

When relay H⁴ becomes energized two signal circuits are completed, one for clearing the lower blade of signal S⁴ and the other for clearing signal U⁴. The circuit for signal U⁴ may be traced from battery G⁴, through wires 49, 84, 85 and 86, front contact 87 of relay H⁴, wire 88, contact 89—89ᵇ controlled by switch 4, wire 90, operating mechanism of signal U⁴, and common wire 20 back to battery G⁴. The circuit for the lower blade of signal S⁴ is similar to the circuit for signal U⁴ except that it contains front contact 91 of relay H⁴ and contact 92—92ᵇ operated by switch 4. It follows therefore that both signals U⁴ and S⁴ are cleared to permit traffic moves over the switch 4 to or from the passing siding Y.

Of course it should be understood that in actual practice the signal circuits might be controlled by track circuits not shown in the drawings or by any other suitable means to prevent the possibility of simultaneously clearing opposing signals. Signal circuits for accomplishing this result are well known in the art and have been omitted from the present disclosure for the sake of simplicity.

It will be noticed that the pick-up circuit for relay H⁴ includes front contact 79 of relay E⁴, which latter relay is normally energized over a circuit including back contact 93 of relay H⁴ and back contact 94 of relay F⁴. When relay H⁴ picks up, however, relay E⁴ is deenergized, due to the opening of back contact 93 of relay H⁴, and relay F⁴ becomes energized, the circuit for this relay including front contact 93 of relay H⁴. When relay E⁴ releases, the circuit for relay H⁴ previously traced is interrupted, but if the push button AR⁴ is restored, before front contact 79 of relay E⁴ opens, a branch is completed around contact 79, from wire 77, through back contact 95 of relay K⁴ and wire 299 to common wire 20. The relay E⁴ is made slow releasing in order to bridge the time interval beginning when relay H⁴ picks up and ending when relay K⁴ releases, due to the restoration of push button AR⁴ to its original condition. With relay K⁴ de-energized, relay H⁴ is held energized by its stick circuit although relay E⁴ is open.

Under these conditions, if the operator wishes to place the signals U⁴ and S⁴ at stop, he may do so by again operating the push button AR⁴. When this occurs, relays J are all energized and K are all energized in the reverse direction. The energization of relay K⁴ thus opens back contact 95 and breaks one branch of the circuit for relay H⁴, which therefore becomes de-energized because the other branch of its circuit is now open at front contact 79 of relay E⁴ and can not become closed until relay F⁴ drops to energize relay E⁴ following the de-energization of relay H⁴. If, however, the operator, after reversing push button AR⁴ to release relay H⁴ restores it to its original condition at any time prior to the closing of back contact 94 of relay F⁴, the relay K⁴ is released before relay E⁴ picks up so that relay H⁴ remains in its de-energized condition. With relay H⁴ released, of course, the signal circuits for signals U⁴ and S⁴ are open, and these signals are returned to their stop positions.

If the operator wishes to restore the switch 4 to its normal position, he reverses the push button AN⁴. This operation connects the batteries B¹, B², B³, and B⁴ with wires 46 and 25, and in similar manner to the operation of push button AR⁴. But it should be noted that the polarity of the current supplied to these conductors is now reversed. The operation of push button AN⁴ therefore energizes all of the relays K and J, but relays K now become energized in the normal direction so that their polar armatures are swung to the left. The energization of relay K⁴ in its normal direction picks up relay C⁴ and subsequently holds this relay in its energized position after push button AN⁴ is restored to its normal position by virtue of circuits similar to those already traced for relay D⁴ when relay K⁴ is energized in the reverse direction. The control of the motor M⁴ by relay C⁴ in returning the switch from its reverse to its normal position is similar to the control of this motor by relay D⁴ in moving the switch from normal to reverse and the circuits will not be traced in detail.

If, after the switch has been restored to its normal position the operator wishes to clear the signals controlling traffic movements over this switch, he may do so by again operating push button AN⁴, thereby picking up relay K⁴ in its normal direction. With switch 4 normal, the normal energization of relay K⁴ can not pick up relay C⁴, but relay H⁴ does become energized, the pick-up circuit for this relay passing from battery G⁴, through wires 49 and 50, front contact 51 of relay R⁴, wires 52 and 53, front contact 54 of relay K⁴, wire 55, normal contact 56—56ᵃ of relay K⁴, wire 97, contact 7—8 operated by switch 4, wire 76, winding of relay H⁴, wires 77 and 78, front contact 79 of relay E⁴, and common wire 20 back to battery G⁴. As soon as relay H⁴ becomes energized, a stick circuit is closed for this relay similar to the stick circuit previously traced for the relay in connection with the operation of the apparatus to clear the signals for a move with the switch 4 reversed. Push button AN⁴ may therefore be restored to its normal position. When relay K⁴ is released its back contact 95 closes a branch for the stick circuit of relay H⁴ around front contact 79 of relay E⁴. It will be noted that when relay H⁴ picks up, relay E⁴ is deenergized and relay F⁴ becomes energized. The circuit for relay H⁴ through front contact 79 of relay E⁴ is therefore open and the closing of back contact 95 of relay K⁴ is necessary to maintain relay H⁴ in its energized condition. When relay H⁴ becomes energized, current flows from battery G⁴, through wires 49, 84, 85 and 86, front contact 87 of relay H⁴, wire 88, contact 89—89ᵃ operated by switch 4, operating mechanism of signal T⁴, and common wire 20 back to battery G⁴. Similarly, current also flows from battery G⁴, through wires 49, 84 and 85, front contact 91 of relay H⁴, wire 98, contact 92—92ᵃ operated by switch 4, operating mechanism of the upper blade of signal S⁴ and common wire 20 back to battery G⁴. Under these conditions, then, signal T⁴ and the upper blade of signal S⁴ are cleared to indicate that movements of traffic may be made over the switch 4 along the stretch of track X.

If, now, the operator wishes to restore the signals to the stop position, he may do so by again operating the push button AN⁴. When this occurs relay K⁴ becomes energized, thereby opening the stick circuit for relay H⁴ at back contact 95 of relay K⁴. Relay H⁴ therefore releases and the signal circuits just traced are interrupted to permit the signals to return to the stop position. Of course when relay H⁴ releases, relay F⁴ becomes de-energized and relay E⁴ picks up. When the operator restores push button AN⁴ to its original position, therefore, the apparatus is restored to the condition in which it is illustrated in the drawings.

It will be observed from the foregoing that the several traffic controlling devices located adjacent the switch 4 may be successively operated from the control point in a predetermined sequence by repeated momentary operation of the same push button. That is to say, if the switch is normal and the signals are at stop, the first operation of the push button AR⁴ reverses the switch, a second operation of the same push button clears the signals, and a third operation of the same push button restores the signals to stop. Similarly, if the switch is reversed, the first operation of the push button AN⁴ moves the switch to normal, a second operation of the push button clears the signals, and the third operation of the push button restores the signals to stop.

In order to select between the various groups of traffic governing devices for the purpose of operating a signal device in any selected group, the relays K are constructed with progressively higher resistances, and the several push buttons located in the dispatcher's office, in addition to permitting impulses of opposite polarities to be impressed upon the wires 25 and 46 are arranged to supply current impulses of different magnitudes to these wires. For example, when push button AR³ is reversed, current is supplied only from batteries B¹, B², and B³ and this current is of such direction as to energize the relays K in the reverse direction. But the magnitude of the current supplied to these relays under these conditions is not sufficient to energize relays K⁴ and J³, though relays K¹, K², and K³ become energized in the reverse direction and relays J¹ and J² also pick up. In similar manner, operation of push button AN³ closes relays J¹ and J² and energizes relays K¹, K², and K³ in the normal direction, but does not energize relays J³ or K⁴. Furthermore, operation of push buttons AN² and AR² closes relay J¹ and energizes relays K¹ and K² in the normal or reverse directions, respectively from batteries B¹ and B² only and does not effect the remaining relays K and J. Finally, operation of push button AN¹ energizes relay K¹ in the normal direction, and operation of push button AR¹ energizes relay K¹ in the reverse direction, but the operation of the two push buttons last mentioned supplies current only from battery B¹ to the wires 25 and 46 and hence none of the relays K or J except relay K¹ is energized by operation of push buttons AN¹ or AR¹. It should be noted, however, that operation of any of the push buttons supplies current of a certain magnitude and polarity to all of the relays J and K over the circuit first traced for these relays, which circuit includes the relays in series.

In explaining the selection between the several groups of traffic governing devices, I will next assume that the operator actuates push button AR². As explained hereinbefore, this results in the closing of relay J¹ and the energization of relays K¹ and K² in the reverse direction, but does not effect the remaining relays J and K. Since relays K³ and K⁴ remain in their de-energized conditions, none of the apparatus associated with switches 3 or 4 is affected. At switch 2, however, the reverse energization of relay K² picks up relay D² by means of a pick-up circuit similar to the pick-up circuit already traced for relay D⁴ with the single exception that the circuit for relay D² includes back contact 99 of relay J². The purpose of this contact, as has already been explained is to prevent operation of relay D² when relay J² is energized, as by operation of AN³, AR³, AN⁴ or AR⁴. The successive operation of the switch motor M², the signal relay H², and the other parts of the apparatus associated with switch 2, is similar to the operation of corresponding parts located at switch 4 and will be understood from the foregoing explanation without further description. It will be apparent, therefore, that the operator at the dispatcher's office, by closing the proper one of the push buttons, may operate one of the traffic governing devices in any selected one of the several groups associated with the separate switches. If he then restores the push button and operates it a second time, a second device in the same selected group is operated. By thus arranging the circuits, so that successive operation of a single push button causes successive operations of different functions, a material saving in line wires is effected.

In order to inform the operator at the control point when a train has left one of the track circuits, I have provided two polarized relays Q and V, adjacent the control point. These relays are normally connected in series across the wires 25 and 46 through normally closed contacts on the push buttons AN¹, AR¹, etc., and are arranged to respond selectively to impulses of different polarities and current strengths. For example, I will assume that a train occupies the track circuit including switch 4. Relay R⁴ is therefore de-energized and relay P⁴ is picked up. When the train leaves the section, relay R⁴ immediately becomes energized, thereby opening the circuit for relay P⁴. But due to the slow-acting characteristics of relay P⁴, an interval of time elapses, during which relays R⁴ and P⁴ are both closed. During this brief interval of time, an impulse of energy is supplied from battery G⁴, over wires 16 and 17, front contact 18 of relay R⁴, wire 101, front contact 102 of relay P⁴, wire 25, wire 103, winding of relay V, wire 104, winding of relay Q, wire 105, thence through contact 203 of each of the push buttons AR², AN², etc., in their normal positions to wire 46, and thence back to battery G⁴. When this circuit is closed, current from the entire battery G⁴ is supplied to relays Q and V and the strength of this current is sufficient to energize both relays. The polarity of this current, furthermore, is such as to energize the relays in their reverse directions, thereby swinging their polar contacts to the right. With relay V energized in the reverse direction, current flows from battery f, through wire 106, front contact 107 of relay V, wire 108, reverse contact 109 of relay V, through the right-hand winding of relay d⁴, and wire 110, back to battery f. The armature of relay d⁴ is therefore swung to the right so that a circuit is completed from battery f, through wires 111 and 112, lamp 113, contact 114 of relay d⁴, and wires 115 and 110 back to battery f. It follows therefore that when a train passes out of the track circuit including switch 4, an impulse of energy is delivered to the relay V, which results in a reversal of relay d⁴. The lighting of lamp 113 therefore informs the operator that the train has left the section including the switch 4. This indication is ordinarily known as an "OS" indication. After the relay d⁴ has once been energized, the armature remains in the position to which it was last moved so that the indication presented by the lighting of lamp 113 persists until the relay d⁴ is positively reversed. This may be accomplished by closing the manually operable circuit controller 116, whereupon current flows from battery f, through wire 111, circuit controller 116, wire 117, the left-hand winding of relay d⁴, and wire 110 back to battery f. It should be noted that the left-hand winding of each of the relays d is included in this circuit in parallel, so that the operation of the circuit controller 116 restores any one or more of the relays d which may happen to be reversed.

The circuit for giving the OS indication from each of the remaining track circuits is similar to that just described in connection with the OS indication from the track circuit including switch 4. But in giving the OS indication from the track circuit including switch 3, it should be noted that during the brief instant that relays R³ and P³ are both closed, the impulse which is delivered to relays Q and V is of the full battery strength of G³, but is of the opposite polarity from the impulse of current supplied to relays Q and V from battery G⁴ when relays R⁴ and P⁴ are energized. As a result of the OS indication from location 3, therefore, relays Q and V are both energized in the normal direction and under these conditions relay d³ is reversed and lamp 118 becomes lighted. Furthermore, when relays R² and P² are both energized for an instant after the passage of a train out of the track circuit including the switch 2, an impulse of current from one-half of battery G² is supplied to relays Q and V. The parts are so proportioned that this current is of sufficient strength to energize relay Q in the reverse direction but relay V is not affected, and current then flows from battery f, over back contact 107 of relay V, front contact 119 of relay Q, and reverse contact 120 of relay Q, to the right-hand winding of relay d². The armature of relay $d^2$ then swings to the right and lamp 121 is therefore lighted to give the operator the OS indication from switch 2. Finally, the OS indication from switch 1 energizes relay Q in the normal direction but does not energize relay V, and when this occurs, relay $d^1$ is operated to light lamp 122. It should be pointed out that operation of the circuit controller 116 will restore any of the relays $d$ which may happen to be reversed.

It should also be pointed out that the circuit over which the relays Q and V receive the OS indication from the various signal locations, includes a normally closed contact 203 on each of the push buttons $AN^1$, $AR^1$, etc. It follows that an OS indication can be received only when all of the push buttons occupy their normal positions. When any one of the push buttons is reversed to supply selective impulses to the wires 25 and 46, the OS indication circuit is broken and the relays Q and V can not then be operated by an impulse of energy from batteries $B^1$, $B^2$, etc.

It has been pointed out that if the track circuit adjacent any switch is occupied, the consequent de-energization of the track relay for such section prevents the operation of any of the devices located in that group. It should also be pointed out that in the main selecting circuit including the relays J and K in series, each relay K and the adjacent relay J are connected in the circuit over a back contact of the corresponding repeater relay P. For example, a portion of this main selecting circuit passes from wire 34 between locations 2 and 3, through wire 35, back contact 36 of relay $P^2$, wires 37 and 38, winding of relay $K^2$, wire 39, winding of relay $J^2$, wire 40, and thence to the apparatus located adjacent switch 1. It will be noted that this circuit includes the back contact 36 of relay $P^2$. But if a train were occupying the track circuit including the switch 2, relay $P^2$ would be energized, so that the circuit just traced would be open. Under the conditions described, however, back contact 109 of relay $R^2$ would be closed so that a branch would be completed around back contact 36 of relay $P^2$ to prevent interruption of the continuity of the main controlling circuit including the relays J and K in series. With this arrangement even though relay $R^2$ is de-energized to prevent operation of any of the devices located adjacent the switch 2, signal impulses can be sent from the control cabin to any of the other groups of devices to operate devices in such groups, although no device can be operated in the group adjacent switch 2. Furthermore, when the train moves out of the section including switch 2, at the instant that relays $R^2$ and $P^2$ are both energized to send an OS indication to the control point, relays $K^2$ and $J^2$ are disconnected from wires 34, so the impulse delivered to wires 25 and 46 for operating relay Q does not operate relays J and K.

Figure 2A:
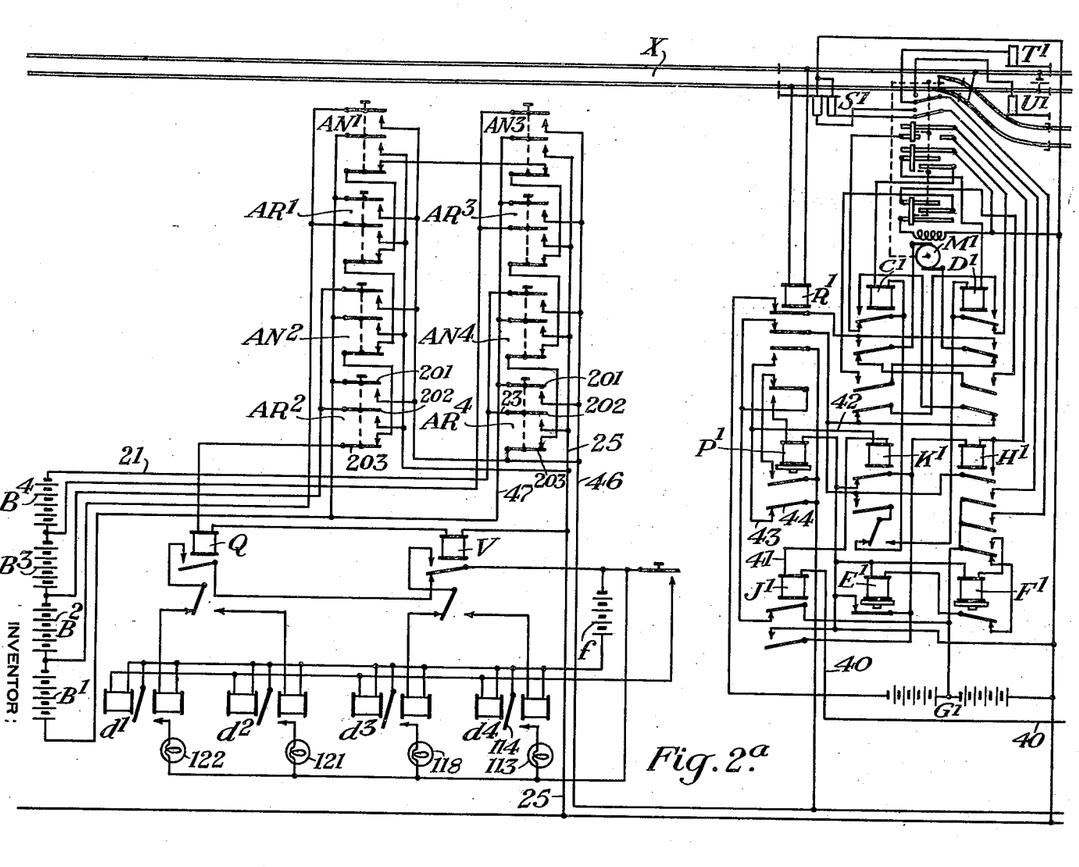
Figs. 2a and 2b, when arranged in similar manner, form a view showing a modified form of a portion of the apparatus shown in Fig. 1.
Figure 2B:
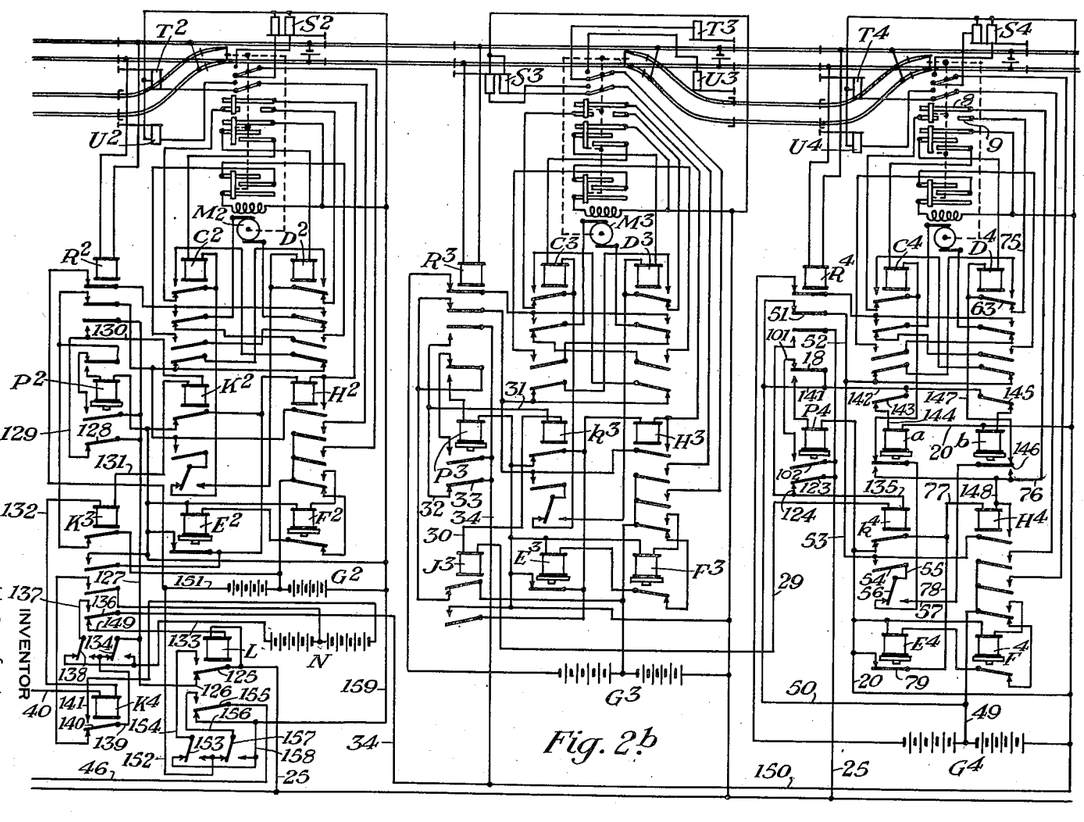

Referring now to Fig. 2, the apparatus shown in this view is similar to that already described in connection with Fig. 1, except that certain of the indications are received at location 2 and are relayed thence to the control point by auxiliary apparatus in order to save line wires. In explaining the operation of the apparatus, I will first assume that the operator wishes to reverse switch 4. He first actuates the push button $AR^4$ to complete the following circuit: From batteries $B^1$, $B^2$, $B^3$, and $B^4$ in series, through wire 21, contact 202 of push button $AR^4$, wire 25, back contact 125 of a normally de-energized relay L, wires 126 and 127, back contact 128 of relay $P^2$, wires 129 and 130, winding of relay $K^2$, wire 131, winding of relay $K^3$, wire 132, winding of relay $K^4$, wire 40, winding of relay $J^1$, wire 41, winding of relay $K^1$, wires 42 and 43, back contact 44 of relay $P^1$, conductor 46, contact 201 of push button $AR^4$, and wire 47 back to battery $B^1$. When this circuit is closed, the strength and polarity of the current supplied by the batteries $B^1$, $B^2$, $B^3$, and $B^4$ is such that all of the relays included in the circuit just traced become energized, the polar relays in the reverse direction. It should be understood that in accordance with the explanation already made in connection with Fig. 1, should the operator have operated push button $AR^3$, current would have been supplied over the circuit just traced, but relay $K^4$ would not have been energized, although the remaining polar relays in the circuit would have become energized in their reverse direction. Returning to the assumption that relay $K^4$ has become energized; since relay $K^3$ is energized, current from battery N flows through wire 133, reverse contact 134 of relay $K^3$, wire 126, back contact 125 of relay L, conductor 25, back contact 123 of relay $P^4$, wires 124 and 135, winding of relay $k^4$, wire 29, winding of relay $J^3$, wire 30, winding of relay $k^3$, wires 31 and 32, back contact 33 of relay $P^3$, wire 34, front contact 136 of relay $K^3$, wire 137, reverse contact 138 of relay $K^3$, wire 139, front contact 140 of relay $K^4$ and wire 141 back to battery N. Current from battery N thus supplied to relays $J^3$, $k^3$ and $k^4$ energizes these three relays, the two latter relays becoming energized in the reverse direction. Relay $k^4$ controls the apparatus located adjacent switch 4 in a manner similar in general to the control of the apparatus located adjacent switch 4 in Fig. 1 but two additional relays $a$ and $b$ are located adjacent switch 4, the functions of which I will now explain.

It will be remembered that with the apparatus shown in Fig. 1, the circuit for relay $H_4$ includes contacts 7—8 or 8—9 operated by switch 4. It is impossible, therefore, to energize relay H to clear the signals unless the switch occupies one extreme position or the other. That is to say, after the operator has initiated a switch movement, he must wait until the switch has attained its extreme position before he can energize relay H to clear the signal. This performance requires 20 or 30 seconds, and in order to prevent this delay I have provided the relays $a$ and $b$. Relay $a$ is provided with a circuit which may be traced from battery $G^4$, through wires 49, 50, 141 and 142, back contact 143 of relay $C^4$, wire 144, winding of relay $a$, and common wire 28 back to battery $G^4$. It follows, therefore, that relay $a$ is energized when relay $C^4$ is de-energized. In similar manner, relay $b$ is controlled by back contact 145 of relay $D^4$, so that relay $b$ is energized when relay $D^4$ is de-energized. Assuming first that relay $k^4$ has been energized in the reverse direction to cause operation of switch 4 from its normal to its reverse position, the energization of relay $D^4$ de-energizes relay $b$. At the expiration of the time interval required for a reversal of the switch, relay $D^4$, becomes de-energized, thereby picking up relay $b$. During the transit of the switch, however, the relay $b$ is de-energized and if the operator actuates push button $AR^4$ during this time interval to energize relay $K^4$ and therefore to energize relay $k^4$ in the reverse direction, a circuit is closed for relay $H^4$ which may be traced from battery $G^4$, through wires 49 and 50, front contact 51 of relay $R^4$, wires 52 and 53, front contact 54 of relay $k^4$, wire 55, reverse contact 56 of relay $k^4$, wire 57, back contact 146 of relay $b$, wire 148, winding of relay $H^4$, wires 77 and 78, front contact 79 of relay $E^4$, and common wire 20 back to battery $G^4$. It is therefore possible to pick up relay $H^4$ to clear the signals before the transit of the switch is completed. After the switch movement is completed so that relay $D^4$ is deenergized and relay $b$ is energized, wire 57 is connected over front contact 146 of relay $b$ with wire 147, and hence with back contact 63 of relay $D^4$. Under these conditions, therefore, the circuit for relay $H^4$ is the same as has already been described in connection with Fig. 1 and the operation of the apparatus is the same as before. In similar manner, the relay $a$, becoming deenergized when relay $C^4$ picks up, permits the signals to be cleared during switch movements from reverse to normal. In all other respects the operation of the apparatus located adjacent switch 4 is the same as in Fig. 1.

The OS indication from switch 4 is transmitted to the control cabin in the following manner: When a train leaves the track section containing switch 4 during the time interval that relays $R^4$ and $P^4$ are both closed, current from battery $G^4$ flows over wires 49, 50 and 141, front contact 18 of relay $R^4$, wire 101, front contact 102 of relay $P^4$, wire 25, winding of relay L, wire 149, back contact 136 of relay $K^3$, and wires 34 and 150, back to battery $G^4$. The impulse of current supplied to this circuit energizes relay L in the reverse direction, thereby completing a circuit from battery $G^2$, through wires 151 and 152, reverse contact 153 of relay L, wire 154, front contact 125 of relay L, wire 25, thence through relays V and Q and contacts 203 of each of the push buttons $AN^1$, $AR^1$, etc. in their normal positions and through wire 46, front contact 155 of relay L, wire 156, reverse contact 157 of relay L, and wires 158 and 159, back to battery $G^2$. The impulse of energy supplied to relays Q and V under these conditions energizes relays Q and V in the reverse direction in the same manner as the OS indication transmitted to these relays from switch 4 in Fig. 1. Reday $d^4$ is therefore energized in the reverse direction to light lamp 113 and give an OS indication from switch 4.

Although I have described the operation of the apparatus located at switch 4, it will be readily understood that should the operator actuate push buttons $AN^3$ or $AR^3$, the apparatus at switch 3 will be operated, since a portion only of battery N is then connected with wires 25 and 150, the selection between relay $k^3$ and relay $k^4$ being accomplished by current strength and polarity under the control of relays $K^3$ and $K^4$ located adjacent switch 2. In similar manner, should a train leave the track circuit including switch 3, the OS indication transmitted by relays $R^3$ and $P^3$ would energize relay L in the normal direction, thereby energizing relays Q and V in the normal direction, and reversing relay $d^3$ at the control point to light lamp 118.

The operation of the apparatus located at switches 1 and 2 for the control of the switch shifting means, and the signals at the locations, is precisely the same as in Fig. 1.

It should also be pointed out that relays similar to relays $a$ and $b$ at location 4 could be installed at any of the other locations to permit the operator to initiate the clearing of the signals before the switch movement is completed.

Figure 3:
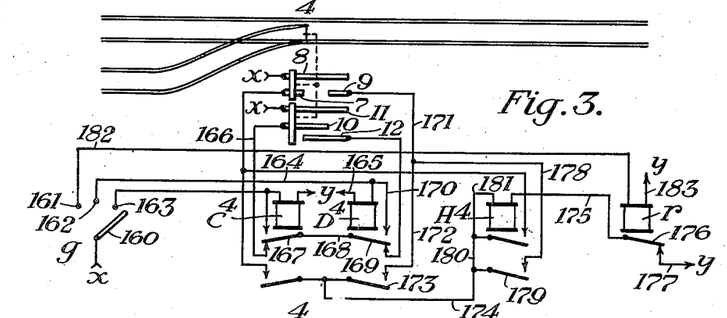
Figs. 3, 4, 5, and 6 are detailed views showing other modifications of a portion of the apparatus illustrated in the preceding figures.

An alternate arrangement of apparatus for controlling the relays C and D is illustrated in Fig. 3 as applied to the group of traffic governing devices associated with switch 4. In this arrangement of apparatus, the relays $C^4$ and $D^4$ are controlled in part by selecting apparatus here represented as a selector $g$ comprising three contacts 160—161, 160—162, and 160—163. The selector may be of any suitable type, and is controlled from a remote point in such manner that any one of its contacts may be closed for a brief interval. As shown in the drawings, the switch 4 occupies its normal position. If the operator wishes to cause operation of the switch to its reverse position, he actuates the selector $g$ to close contact 160—162 for a brief interval. When this happens, current flows from terminal $x$, of a suitable source of energy not shown in the drawings, through contact 160—162 of selector $g$, wire 164, winding of relay $D^4$, and back to terminal $y$ of the same source. The relays C and D control the switch motor $M^4$, not shown in Fig. 3, in the same manner as has already been described in connection with Figs. 1 and 2, so that when relay $D^4$ becomes energized, the motor is actuated to reverse the switch 4. The selector $g$ may be restored to its normal position as soon as the relay $D^4$ becomes energized; the relay $D^4$ does not open however, because it is held in its energized condition by virtue of a stick circuit which passes from terminal $x$, through contact 10—11 operated by switch 4, wire 166, back contact 167 of relay $C^4$, wire 168, front contact 169 of relay $D^4$, wire 170, and winding of relay $D^4$ to terminal $y$. The relay $D^4$ therefore remains closed until contact 10—11 opens at a point near the end of the reverse stroke of the switch 4, whereupon the relay opens to de-energize the switch operating motor.

When the switch has attained its full reverse position, contact 8—9 closes. If the operator wishes to clear the signals controlling the switch, he may do so by again closing contact 160—162 of selector $g$, thereby again picking up relay $D^4$. Current then flows from terminal $x$, through contact 8—9 operated by switch 4, wires 171, and 172, front contact 173 of relay $D^4$, wires 174, 180 and 181, winding of relay $H^4$, wire 175, back contact 176 of relay $r$, and wire 177 to terminal $y$. Relay $H^4$ therefore becomes energized and this relay may be utilized to control the signal circuits in the same manner as in Figs. 1 and 2. As soon as relay $H^4$ has closed its front contacts the selector $g$ may be restored to its original condition, relay $H^4$ subsequently remaining energized by virtue of its stick circuit from terminal $x$, through contact 8—9 operated by switch 4, wires 171 and 178, front contact 179 of relay $H^4$, and wires 180 and 181, winding of relay $H^4$, wire 175, back contact 176 of relay $r$, and wire 177 to terminal $y$. It will be apparent therefore, that relay $H^4$ will remain picked up after having once been energized as long as relay $r$ is de-energized and the switch occupies its reverse position. If the operator wishes to de-energize relay $H^4$ to restore the signals to the stop positions, he closes contact 160—161, whereupon current flows from terminal $x$, through contact 160—161, wire 182, winding of relay $r$, wire 183, to terminal $y$. Relay $r$ therefore becomes energized, opening its back contact 176, and breaking the stick circuit for relay $H^4$. The signal control relay $H^4$ therefore becomes de-energized and this relay may again be energized only by manipulation of the selector $g$ to close the pick-up circuit for the relay.

The control of relay $C^4$ is similar to the control of relay D⁴ and the operation of the apparatus for switch movements from reverse to normal and for clearing the appropriate signals will be understood without further explanation.

Figure 4:
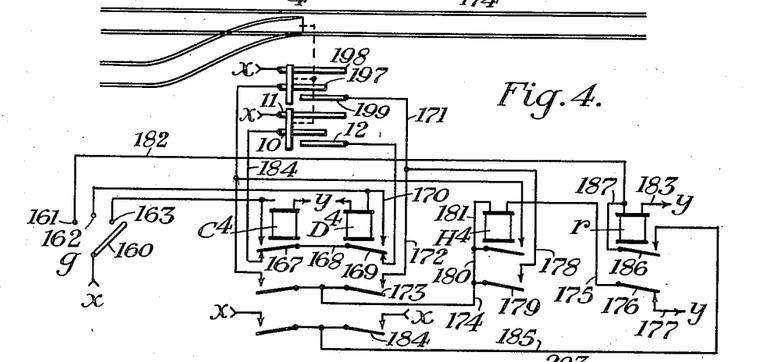

In Fig. 4 the control circuits for relays C⁴ and D⁴ are the same as in Fig. 3. In Fig. 4, however, after the selector g has been operated to pick up relay D⁴, the switch 4 controls a contact 197—198 similar to contact 10—11, and a contact 198—199 similar to contact 11—12, and the pick-up circuit for relay H is closed automatically, as soon as the actual movement of the switch has commenced. This pickup circuit passes from terminal x, through contact 198—199 operated by switch 4, wires 171 and 172, front contact 173 of relay D⁴, wires 174, 180 and 181, winding of relay H⁴, wire 175, back contact 176 of relay r, and wire 177 to terminal y. The relay H⁴ may control the signals governing traffic movements over switch 4, in the same manner as in Figs. 1 and 2, and with this arrangement, it will be manifest that relay H⁴ becomes energized automatically as soon as the transit of the switch commences, and the signals will be cleared automatically as soon as the switch completes its movement. After the relay H⁴ has once been picked up, it is subsequently maintained in its energized condition by a stick circuit from terminal x, through contact 198—199, wires 171 and 178, front contact 179 of relay H⁴, wires 180 and 181, winding of relay H⁴, wire 175, back contact 176 of relay r, and wire 177 to terminal y.

If the operator does not wish to clear the signals at the time the switch is reversed, he may release relay H⁴ before the switch completes its movement by operating the selector g to close contact 160—161 as soon as relay D⁴ becomes energized. Current then flows from terminal x, through contact 160—161, wire 182, winding of relay r, and wire 183 to terminal y. The closing of contact 186 of relay r completes a stick circuit for this relay which passes from terminal x, through front contact 184 of relay D⁴, wire 185, front contact 186 of relay r, wire 187, winding of relay r, and wire 183 to terminal y. When relay r picks up, it opens its back contact 176 included in the pickup and stick circuits of relay H⁴ so that relay H⁴ will be released, while if the selector contact 160—161 is closed prior to operation of relay H⁴, relay H⁴ will not become energized. In either case, relay H⁴ will remain deenergized after relay r picks up as long as the switch is in transit, because relay r will be held in its energized position by virtue of its stick circuit as long as relay D⁴ is energized to reverse the switch. When relay D⁴ becomes de-energized, front contact 184 of this relay opens, thereby breaking the stick circuit for relay r, allowing this relay to open. But relay H⁴ can not now be picked up automatically, because its pick-up circuit is open at front contact 173 of relay D⁴. If the operator wishes to clear the signals, he may do so by again closing contact 160—162 of selector g. This operation energizes relay D⁴, thereby completing the pick-up circuit for relay H⁴. The control of relay C⁴ by contact 160—163 of selector g is similar to the control of relay D⁴ by contact 160—162 and will be readily understood from the drawings.

It should be pointed out that there is a slight difference in the operation of the systems disclosed in Figs. 3 and 4. In Fig. 3 the operator closes a contact to reverse the switch, and again closes the same contact to clear the associated signals. He may then place the signals at stop by closing a second contact. In Fig. 4, however, the operator closes one contact to reverse the switch. When the transit of the switch has commenced, the signal control relay is automatically energized to clear the signals without requiring further action on the part of the operator, but he may, if he wishes, prevent the automatic clearing of the signals by closing a second contact. In Fig. 4, if the operator does prevent or nullify the automatic operation of relay H⁴ he must deliberately close a selector contact to energize relay H⁴, if he wishes to clear the signals.

Figure 5:
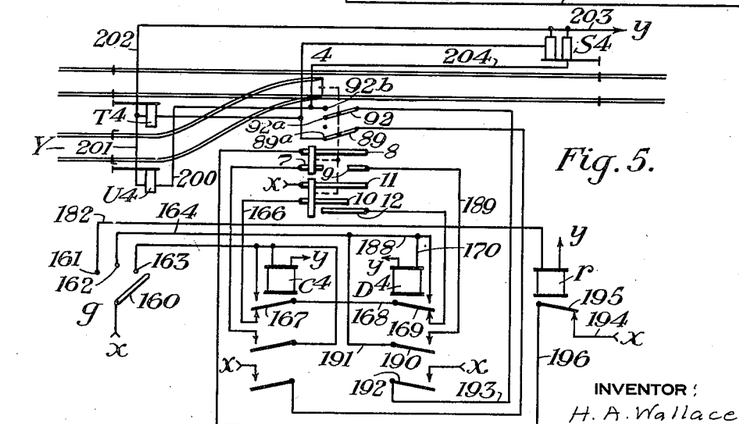

Referring now to Fig. 5, the apparatus disclosed in this view is similar to the system shown in Fig. 3, except that the signal control relay H⁴ is omitted. In Fig. 5, if the operator wishes to reverse the switch, he closes contact 160—162 of selector g to energize relay D⁴, as has been explained in connection with Fig. 3. The energization of relay D⁴ reverses the switch and at the same time completes a stick circuit for the relay through contact 10—11 operated by switch 4, back contact 167 of relay C⁴, and front contact 169 of relay D⁴, in the same manner as in Figs. 3 and 4. After the switch has attained its reverse position, relay D⁴ is held closed by another stick circuit which passes from terminal x, through wire 194, back contact 195 of relay r, wire 196, contact 8—9 operated by switch 4, wire 189, front contact 199 of relay D⁴, wires 191 and 188, and winding of relay D⁴, back to terminal y. Relay D⁴ is maintained in its energized condition over the stick circuit just traced, as long as the switch is in its reverse position and relay r, is de-energized, although the selector g may be restored to its original condition. With relay D⁴ energized, and with the switch in its reverse position, current flows from terminal x, over front contact 192 of relay D⁴, wire 193, contact 92—92ᵇ operated by switch 4, wire 200, operating mechanism of signal U⁴, and wires 201, 202 and 203, to terminal y. Current also flows from contact 92—92ᵇ through wire 204, operating mechanism of the lower blade of signal S⁴, and wire 203 to terminal y. When the circuits just traced are closed, therefore, signal U⁴ and the lower blade of signal S⁴ are cleared to permit traffic moves over the switch 4 to or from the passing siding Y. It should be pointed out that the signals cannot be cleared by energization of relay D⁴ until the switch has assumed its reverse position.

It will be plain from the drawings that by energization of relay C⁴, the switch may be restored to its normal position and the signal T⁴ and the upper blade of signal S⁴ may be cleared over circuits which are similar to those just described in connection with switch movements from normal to reverse and the operation of the signals governing such movements.

Returning to the assumption that relay D⁴ has been energized and is being held by its stick circuit over back contact 195 of relay r, the operator may restore the signals to the stop positions by closing contact 160—161 of selector g, thereby energizing relay r, and opening back contact 195. This operation causes relay D⁴ to be de-energized, breaking the control circuits for signal U⁴ and the lower blade of signal S⁴ at front contact 192 of relay D⁴. The signals are therefore returned to their stop positions and may again be placed at clear only by again picking up relay D⁴ by closing contact 160—162 of selector g. The operation of the apparatus shown in Fig. 5 is therefore similar to that described in connection with Fig. 4, in that the closing of contact 160—162 or 160—163 causes the operation of the switch to the corresponding position and the automatic clearing of the signals for the route determined by the switch position, and the closing of contact 160—161 restores all signals to the stop position.

Figure 6:
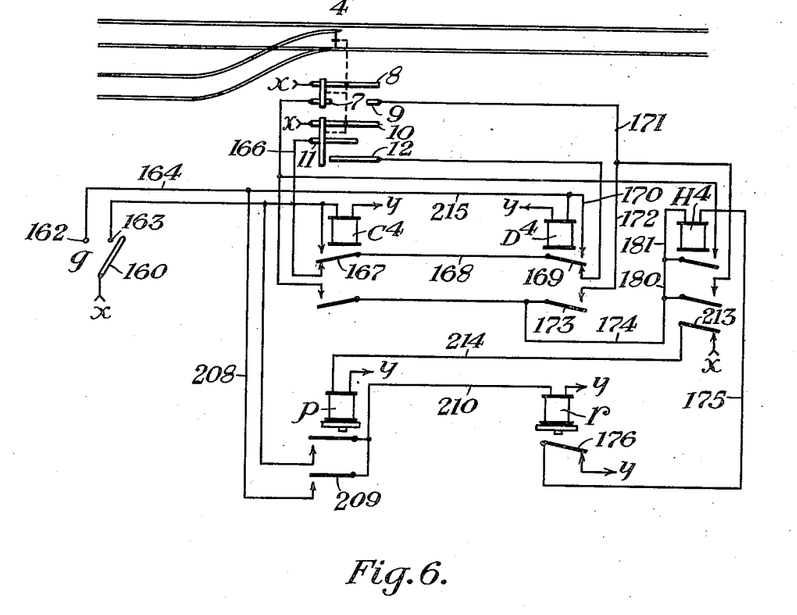

Referring now to Fig. 6, the apparatus here shown is similar to that disclosed in Fig. 3 with the exception that relay $r$ is made slow acting and is controlled by a second slow acting relay $p$ in addition to the selector $g$. With the apparatus shown in Fig. 6, the operator may reverse the switch 4 by closing contact 160—162 of selector $g$. Relay $D^4$ then picks up, and is stuck up over back contact 167 of relay $C^4$ and contact 10—11 until the switch has moved to its reverse position, whereupon relay $D^4$ becomes de-energized. If the operator then closes contact 160—162 of selector $g$ a second time, relay $H^4$ is picked up and stuck up in the same manner as in Fig. 3, thereby clearing the signals associated with switch 4. It will be noticed that the relay $H^4$ is stuck up over a back contact of relay $r$ and that the circuit for relay $p$ from terminal $x$, over back contact 213 of relay $H^4$, wire 214, and winding of relay $p$, to terminal $y$ is now opened so that relay $p$ becomes de-energized. If the operator wishes to restore the signals to stop, he may do so by closing either contact of selector $g$. If contact 160—162 is closed when relay $p$ is released current flows from terminal $x$, through contact 160—162 of selector $g$, wires 164 and 208, back contact 209 of relay $p$, wire 210, and winding of relay $r$ to terminal $y$. Relay $r$ thereupon becomes energized, opening at back contact 176 thereon, the stick circuit for relay $H^4$ so that the latter relay opens to restore the signal to stop.

The operation of the apparatus in moving the switch from reverse to normal, and in clearing the corresponding signals is similar to that just described in moving the switch from normal to reverse, and will be understood without further explanation.

It should be noted that relay $p$ becomes de-energized as soon as relay $H^4$ picks up in response to the closing of contact 160—162 of selector $g$, but relay $p$ is slow-acting, and therefore does not close its back contacts for a time interval long enough to insure that the selector contact will open before relay $p$ closes its back contact. Relay $r$ is also made slow acting so that after this relay becomes de-energized, due to the opening of the selector contact, a time interval will elapse before its back contacts become closed, and relay $D^4$ will release before relay $r$ releases and will open contact 173 in the pickup circuit of relay $H^4$ before back contact 176 closes, to insure that relay $H^4$ does not again pick up on the same impulse that energizes relay $r$.

It will be observed that in Figs. 3, 4, 5, and 6, I have illustrated only a portion of the apparatus located adjacent switch 4, but it is manifest that similar apparatus to that shown in these views could be associated with any reasonable number of groups of railway traffic governing devices and that these groups could be selectively controlled by apparatus under the control of an operator at a control point in exactly the same manner as has already been described in connection with Figs. 1 and 2.

In describing my invention I have disclosed apparatus for performing certain functions such as controlling switches and signals; and for returning certain indications to the dispatcher's office, but it is apparent that the invention is not limited to this particular arrangement.

In the above description, I have pointed out that one feature of my invention is the provision, in systems of the type here contemplated, of means for performing one function in response to a first operation of a control element, and for performing a different function in response to a repeated identical operation of the same element. This broad idea is disclosed but is not claimed in my copending application, Serial No. 235,245, filed November 23, 1927, for Railway traffic controlling apparatus.

Although I have herein shown and described only a few forms of remote controlling apparatus embodying my invention, it is understood that various changes and modifications may be made therein within the scope of the appended claims without departing from the spirit and scope of my invention.

Having thus described my invention, what I claim is:

1. In combination with a stretch of track having a plurality of switches located at intervals along such stretch, a plurality of polarized relays one associated with each switch and requiring currents of different magnitudes to energize the relays, a source of current at times connected with all said relays, manually operable means for controlling the magnitude and polarity of the current supplied to such relays and means controlled by each relay for controlling the associated switch.

2. In combination a first and a second traffic governing device located at spaced points, a first relay adjacent the first device, a second and a third relay adjacent said first and second devices respectively and requiring for their operation a different magnitude of current than said first relay, means controlled by said first and second relays for operating said first device, means controlled by said third relay for operating the second device, and means for at times supplying currents of different magnitudes to said three relays in series for selectively controlling said devices.

3. In combination, a railway switch having a normal and a reverse position, a first trackway signal for governing traffic over said switch in its normal position, a second signal for governing traffic over the switch in its reverse position, a polarized relay, means for energizing said polarized relay in one direction or the other, means effective when said polarized relay is energized in either direction to move the switch to a corresponding position, a second relay, means effective when said polarized relay is subsequently energized in either direction and when the switch occupies a corresponding position to energize said second relay, and means controlled by a front contact of said second relay for operating said first or said second signal according as the switch occupies its normal or reverse position.

4. In combination with a railway switch, a polarized relay, means for at times supplying said polarized relay with current impulses of one polarity or another, means set into operation by energization of the polarized relay to move the switch to its normal or reverse position depending upon the direction of energization of said relay, a signal control relay, a slow-acting relay controlled by said signal control relay, a pick-up circuit for said signal control relay responsive to the position of the switch and controlled by said polarized relay and by said slow-acting relay, a stick circuit for the signal control relay controlled by the polarized relay but not by said slow-acting relay, and signals for governing traffic over said switch and controlled by said signal control relay and by said switch.

5. In combination with a railway switch, a polarized relay controlled from a point remote from the switch, a second relay controlled by normal and front contacts on the polarized relay and by the position of the switch, a third relay controlled by reverse and front contacts of the polarized relay and by the position of the switch, means for moving the switch to its normal or reverse position according as said second or third relay is energized, a fourth relay, a fifth relay having a circuit including a back contact of said fourth relay, a first and second contact closed when the switch is normal and reverse respectively; a pick-up circuit for said fourth relay including front and normal contacts on the polarized relay, a back contact of said second relay, said first contact, and a front contact of said fifth relay; a second pick-up circuit for the fourth relay including front and reverse contacts of the polarized relay, a back contact of the third relay, said second contact, and a front contact of the fifth relay; a stick circuit for the fourth relay including its own front contact and a back contact of the polarized relay; and signals for governing traffic over said switch and controlled by the fourth relay and by the switch.

6. In combination, a group of traffic governing devices, apparatus effective when operated to actuate one such device, means responsive to a second identical operation of such apparatus to actuate a different one of the devices in said group, and means responsive to a third identical operation of such apparatus to restore said different device to its original condition.

7. In combination with a railway switch, a signal governing traffic over said switch, a manually operable push button, means responsive to a first operation of said push button to move the switch to a predetermined position, means responsive to a second operation of said push button to operate the signal, and means responsive to a third operation of the push button to restore the signal to its original position.

8. In combination with a stretch of track having a plurality of traffic governing devices located at intervals along said stretch, a plurality of relays one for each such device and requiring currents of different characters to operate the relays, means located at a control point for supplying currents of different characters to a circuit including all said relays, means controlled by each relay for operating the associated device, means controlled by traffic conditions adjacent the several devices for supplying currents of different characters to a portion of said circuit, and means located at the control point and selectively responsive to said last mentioned currents.

9. In combination with a stretch of railway track, a plurality of traffic governing devices located at intervals along said stretch, a first group of relays requiring currents of different characters to operate the relays, means located at a control point for supplying current of different characters to all the relays of the first group, means controlled by certain of the relays of the first group for controlling certain of said traffic governing devices, a second group of relays requiring currents of different characters to operate the relays, means controlled by the remaining relays of the first group for at times supplying currents of different characters to all the relays of the second group, and means controlled by the relays of the second group for selectively controlling the remaining traffic governing devices.

10. In combination with a stretch of railway track, a plurality of traffic governing devices located at intervals along said stretch, a first group of relays requiring currents of different characters to operate the relays, means located at a control point for supplying current of different characters to a first circuit including all the relays of such first group, means controlled by certain of the relays of the first group for controlling certain of said traffic governing devices, a second group of relays requiring currents of different characters to operate the relays, means controlled by the remaining relays of the first group for at times supplying currents of different characters to a second circuit including all the relays of such second group, means controlled by the relays of the second group for selectively controlling the remaining traffic governing devices, means controlled by traffic conditions adjacent said remaining devices for at times supplying currents of different characters to a portion of said second circuit, apparatus selectively responsive to such last mentioned currents, means controlled by traffic conditions adjacent said certain devices and by said apparatus for at times supplying currents of different characters to a portion of said first circuit, and means located at said control point selectively responsive to such last mentioned currents to indicate traffic conditions adjacent the separate devices.

11. In combination, a line circuit containing a polar relay and a neutral relay requiring for their operation currents of different magnitudes, means for supplying said circuit with currents of different magnitudes and polarities, a railway traffic governing device, and means effective when said neutral relay is deenergized to control said device in accordance as said polar relay is energized by current of one polarity or another.

12. In combination with a plurality of railway traffic governing devices located at two spaced points, two polar relays one at each said point requiring for their operation currents of different magnitudes, a neutral relay at one said point requiring for its operation the same magnitude of current as the polar relay at the other point, a series line circuit including said polar relays and said neutral relay, means for supplying said line circuit with currents of different strengths and polarities, means controlled by one polar relay for controlling one said governing device, and means controlled jointly by the other polar relay and the associated neutral relay for controlling the other said governing device.

13. In combination with a plurality of railway traffic governing devices located at spaced points, a plurality of polar relays one at each said point and requiring for their operation currents of different magnitudes, a neutral relay at one point requiring for its operation the same magnitude of current as the polar relay at the adjacent point, a series line circuit including said polar relays and said neutral relay, means for supplying said line circuit with currents of different strengths and polarities, and means effective only when said neutral relay is deenergized for controlling the corresponding governing device in accordance with the energization of the associated polar relay by current of one polarity or another.

14. In combination with a plurality of railway traffic governing devices located at two spaced points, two polar relays one at each said point and requiring for their operation currents of different magnitudes, a neutral relay associated with the polar relay requiring the smaller magnitude of current, said neutral relay requiring for its operation the same magnitude of current as the polar relay at the other point, a series line circuit including said polar relays and said neutral relay, means for supplying said line circuit with currents of different strengths and polarities, means for controlling one governing device by the polar relay requiring the greater magnitude of current, and means for controlling the other governing device by the polar relay requiring the smaller magnitude of current provided the associated neutral relay is deenergized.

15. In combination, a stretch of railway track, a plurality of traffic governing devices for directing traffic through said stretch, a manually operable device, a stick relay having pick-up and stick circuits one of which is controlled by said manually operable device and the other of which is controlled by a second device, and means controlled by said relay for controlling said traffic governing devices successively.

16. In combination, a polarized control relay for controlling a railway track switch, a neutral control relay for said switch responsive only to current of greater magnitude than is necessary for operating said polarized control relay, a circuit including said polarized and neutral control relays in series, means for supplying said circuit with current to which said polarized but not said neutral control relay will respond, and means for at times supplying said circuit with current to which said neutral as well as said polarized control relay will respond.

17. In combination, a railway switch, a manually controlled selector, a switch controlling relay controlled by said selector and by said switch, a second relay controlled by said selector; a signal relay controlled by said second relay, said switch, and said switch controlling relay; and a signal controlled by said signal relay.

18. In combination with a railway switch, a first relay, means effective when said first relay is energized to reverse the switch, manually controlled means for energizing said first relay, means for subsequently holding said first relay closed until the reversal of the switch is completed, a second relay, a third relay, manually controlled means for energizing said third relay, a pick-up circuit for said second relay arranged to be closed when said first relay is energized after the reversal of the switch, a stick circuit for said second relay controlled by said third relay and effective when the switch has been reversed, and signals controlled by the second relay for governing traffic over said switch.

19. In combination, a group of two-position traffic governing devices, apparatus operable to either of two positions and effective when operated to actuate one such device to a corresponding position, means responsive to a second identical operation of such apparatus after the device has assumed the corresponding position to actuate a different one of the devices in said group, and means responsive to a third identical operation of such apparatus to restore said different one of such devices to its original condition.

20. In combination, a railway switch, a manually controlled contact, a first relay controlled by said contact and by said switch, a motor controlled by said first relay for actuating said switch, a second relay, a third relay controlled by said contact and by said second relay, means controlled by said third relay for at times placing said second relay under the control of said contact, and a signal controlled by said third relay.

21. In combination, a railway switch, a normally open manually controlled contact, a first relay controlled by said contact and by said switch, a second relay, a third relay, a fourth relay, a pick-up circuit for said second relay controlled by said first relay and by said fourth relay, a stick circuit for said second relay controlled by said switch and by said fourth relay, a circuit for said third relay controlled by said second relay, a circuit for said fourth relay controlled by said contact and by said third relay, a motor controlled by said first relay for operating said switch, and a signal controlled by said second relay for governing traffic over said switch.

22. In combination with a railway switch having a normal and a reverse position, two signals for governing traffic over said switch in its two positions respectively, two normally open contacts, manually controlled means for closing a selected one of such contacts for a brief interval of time, means for moving the switch to its normal or reverse position according as one or the other of said contacts is closed, means effective when one of said contacts is closed when the switch occupies a position corresponding to such contact to clear a selected one of said signals, and means effective when a signal has been cleared to restore the signal to stop if either of said contacts is closed.

23. In combination with a railway switch, a pair of manually controlled switch stick relays for governing the position of said switch, a manually controlled trip relay; a signal stick relay controlled by said switch stick relays, by said switch and by said trip relay; and a signal controlled by said signal stick relay for governing traffic over said switch.

24. In combination with a railway switch, a pair of switch relays for governing the position of the switch, a manually controlled pick-up circuit for each switch relay, a stick circuit for each switch relay controlled by the other switch relay of the pair and by said switch, a signal relay, two pick-up circuits for said signal relay each controlled by one of said switch relays and by said switch, a manually controlled trip relay, a stick circuit for said signal relay controlled by the trip relay, and a signal controlled by said signal relay for governing traffic over said switch.

25. In combination with a railway switch, a pair of switch relays for governing said switch, manually controlled means for selectively energizing said switch relays, a stick circuit for each switch relay controlled by said switch, a signal relay controlled by said switch relays and by said switch, a trip relay having a contact controlling said signal relay, an auxiliary relay controlled by said signal relay, control circuits for said trip relay controlled by said auxiliary relay and by said manually controlled means, and a signal controlled by said signal relay for governing traffic over said switch.

26. In combination, a railway traffic governing device, a control relay for said device, a second relay, a stick relay, manually controllable means for at times momentarily operating said control relay, a pick-up circuit for the stick relay including a front contact of the control relay and a front contact of the second relay, a stick circuit for the stick relay including its own front contact, means including a back contact of said control relay for at times opening said stick circuit to release the stick relay, and means controlled by said stick relay for controlling said governing device.

27. In combination, a railway traffic governing device, manual control means located at a point remote from the device, a control relay arranged to be energized momentarily in response to an operation of said control means, a stick relay, a contact, means effective to energize the stick relay in response to a momentary energization of the control relay while said contact is closed, means effective to release the stick relay in response to a momentary energization of the control relay while said contact is open, means for controlling said contact, and means controlled by said stick relay for controlling said governing device.

HERBERT A. WALLACE.